(12) United States Patent
McGlew et al.

(10) Patent No.: US 10,672,310 B2
(45) Date of Patent: Jun. 2, 2020

(54) MICROELECTROMECHANICAL SYSTEM OVER-SCANNING FOR PUPIL DISTANCE COMPENSATION

(71) Applicant: North Inc., Kitchener (CA)

(72) Inventors: Patrick Gerard McGlew, Romainmotier (CH); Nicolas Abele, Lausanne (CH); Alexandre Fotinos, Chavannes-Près-Renens (CH)

(73) Assignee: North Inc., Kitchener, Ontario (CA)

( * ) Notice: Subject to any disclaimer, the term of this patent is extended or adjusted under 35 U.S.C. 154(b) by 0 days.

(21) Appl. No.: 16/245,753

(22) Filed: Jan. 11, 2019

(65) Prior Publication Data

US 2019/0189037 A1    Jun. 20, 2019

Related U.S. Application Data

(63) Continuation of application No. 15/390,346, filed on Dec. 23, 2016, now abandoned.

(51) Int. Cl.
| | | |
|---|---|---|
| G09G 3/00 | (2006.01) | |
| G02B 26/10 | (2006.01) | |
| G02B 26/08 | (2006.01) | |
| G02B 27/01 | (2006.01) | |
| H04N 9/31 | (2006.01) | |

(52) U.S. Cl.
CPC ......... *G09G 3/002* (2013.01); *G02B 26/0833* (2013.01); *G02B 26/105* (2013.01); *G02B 27/0172* (2013.01); *G09G 3/007* (2013.01); *H04N 9/3129* (2013.01); *G02B 2027/0127* (2013.01); *G02B 2027/0161* (2013.01); *G02B 2027/0174* (2013.01); *G02B 2027/0178* (2013.01)

(58) Field of Classification Search
CPC .... G09G 3/002; G09G 3/007; G02B 26/0833; G02B 26/105; G02B 26/0172
See application file for complete search history.

(56) References Cited

U.S. PATENT DOCUMENTS

| | | | |
|---|---|---|---|
| 9,560,328 B1* | 1/2017 | McVittie | H04N 9/3194 |
| 2006/0192094 A1 | 8/2006 | Taniguchi | |
| 2008/0007809 A1 | 1/2008 | Moss | |
| 2010/0103077 A1* | 4/2010 | Sugiyama | G02B 27/017 345/8 |
| 2013/0141527 A1 | 6/2013 | Shimizu et al. | |
| 2016/0033771 A1* | 2/2016 | Tremblay | G02B 26/10 345/8 |
| 2017/0293147 A1* | 10/2017 | Tremblay | G02B 26/10 |

FOREIGN PATENT DOCUMENTS

| | | |
|---|---|---|
| JP | 2005221888 | 8/2005 |
| JP | 2006209144 | 8/2006 |

OTHER PUBLICATIONS

U.S. Appl. No. 15/390,346, filed Dec. 23, 2016.

\* cited by examiner

*Primary Examiner* — Ariel A Balaoing
(74) *Attorney, Agent, or Firm* — Thomas Mahon

(57) ABSTRACT

Disclosed herein are devices and methods to provide a display including a projection system and a lens including a holographic optical element to receive light and reflect the light to an exit pupil. The projection system is adapted to move the image projected onto the lens based on a location of the HOE within the lens.

20 Claims, 19 Drawing Sheets

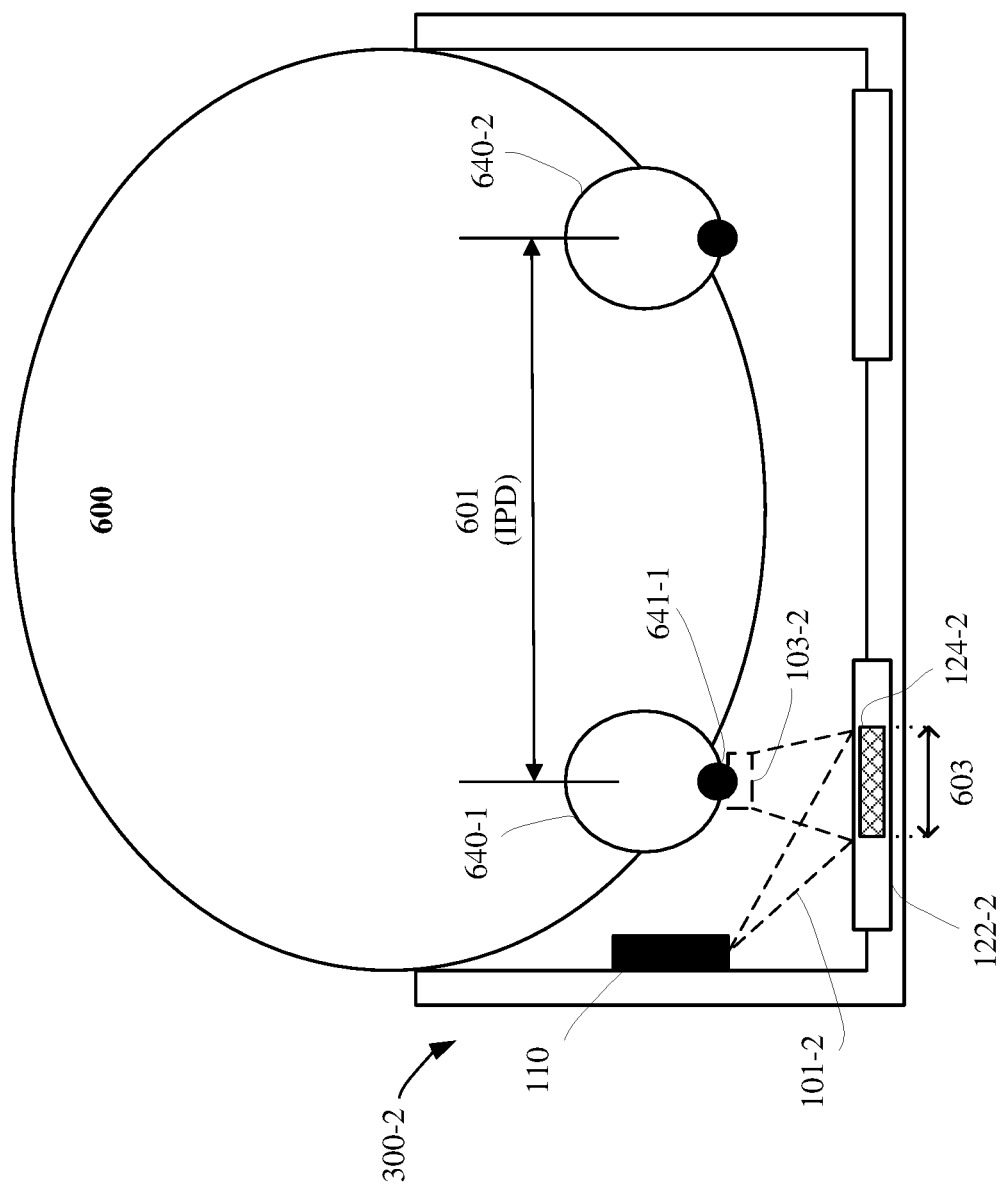

1000

```
┌─────────────────────────────────────────────────────────────────────┐
│          Oscillate a MEMS mirror about an oscillation axes.         │
│                                 1010                                │
└─────────────────────────────────────────────────────────────────────┘
                                    │
                                    ▼
┌─────────────────────────────────────────────────────────────────────┐
│ Direct light from a light source at the MEMS mirror, the light      │
│ corresponding to a plurality of pixels of an image.                 │
│                                 1020                                │
└─────────────────────────────────────────────────────────────────────┘
                                    │
                                    ▼
┌─────────────────────────────────────────────────────────────────────┐
│ Send a control signal to the light source, the control signal to    │
│ include an indication of a first start time of a first one of the   │
│ plurality of pixels in relation to a period of oscillation of the   │
│ MEMS mirror.                                                        │
│                                 1030                                │
└─────────────────────────────────────────────────────────────────────┘
```

FIG. 10

MICROELECTROMECHANICAL SYSTEM OVER-SCANNING FOR PUPIL DISTANCE COMPENSATION

CROSS-REFERENCE TO RELATED APPLICATIONS

This application is a continuation of U.S. patent application Ser. No. 15/390,346, filed Dec. 23, 2015, the entire content of which is incorporated herein by reference.

TECHNICAL FIELD

Embodiments herein generally relate to head worn displays and heads up displays; and in particular to a wearable display to accommodate a range of pupil distances.

BACKGROUND

Modern display technology may be implemented to provide head worn displays (HWD) and to see through the display and to see information (e.g., images, text, or the like) in conjunction with the see through display. Such displays can be implemented in a variety of contexts, for example, defense, transportation, industrial, entertainment, wearable devices, or the like.

In particular, an image may be reflected off a transparent projection surface to a user's eye to present an image in conjunction with a real world view. Conventionally, HWD systems have extremely difficult tradeoffs between various design and utility considerations, such as, for example, bulk, form-factor, see-through quality, field of view, etc. For example, achieving a normal eyewear form factor without bulk has not been achieved in a commercial head mounted display.

Adding to the difficulty in designing and manufacturing commercial HWDs is the range over which different user's physiology (e.g., interpupillary distance (IPD), or the like) can vary.

BRIEF DESCRIPTION OF THE DRAWINGS

FIGS. 6A-6C illustrate the example optical system of FIG. 3 in conjunction with a second user.

FIG. 10 illustrates an example logic flow.

DETAILED DESCRIPTION

Figure 1:
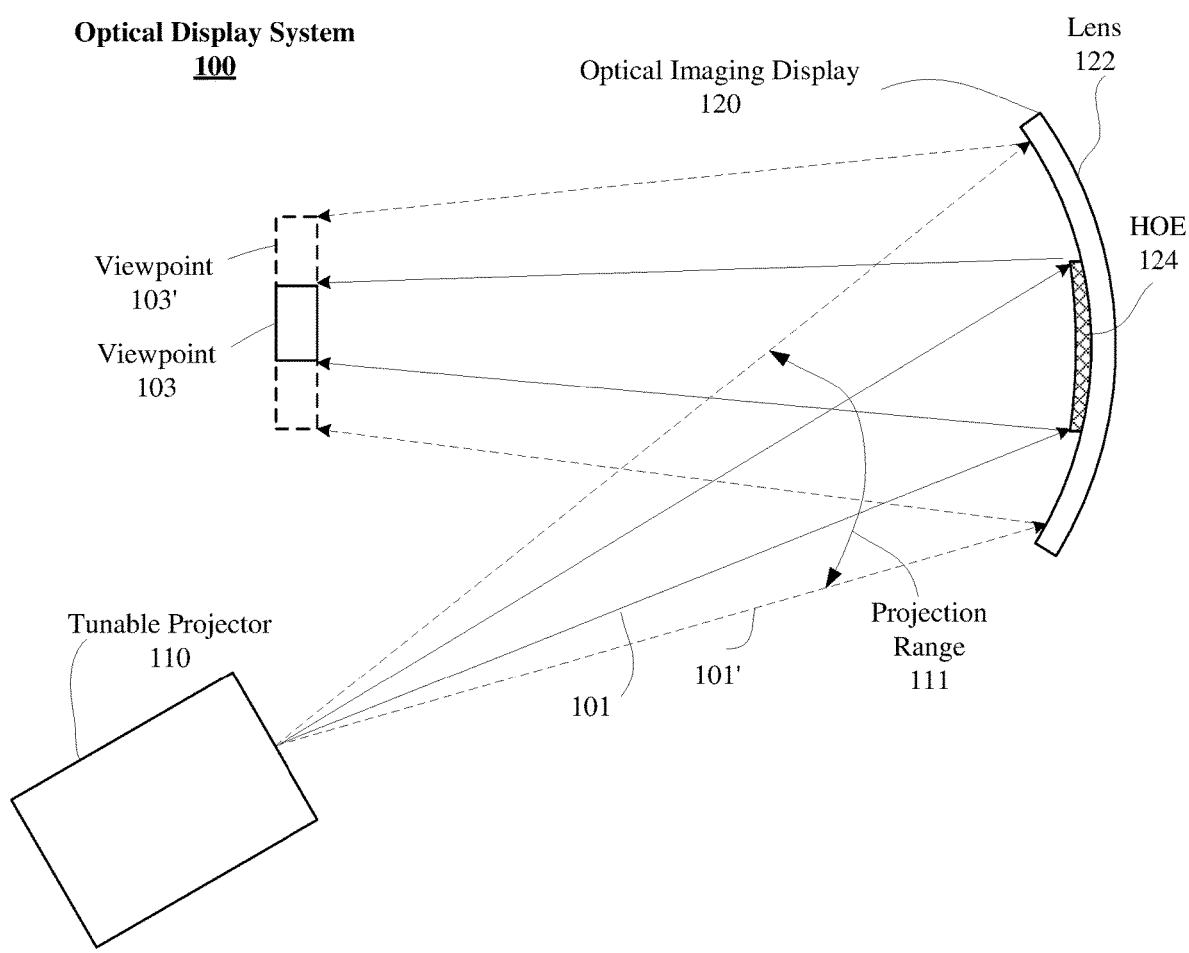
FIG. 1 illustrates a first example optical display system.

Various embodiments may be generally directed to head worn displays (HWDs) and specifically to a HWD with a projector configured to project images corresponding to a location on a lens. In general, HWDs provide a projection system and a lens that includes a holographic optical element (HOE). The projection system and the lens can be mounted to a frame to be worn by a user, for example, glasses, a helmet, or the like. During operation, the projection system projects an image onto an inside (e.g., proximate to the user) surface of the lens. The HOE reflects the image to an exit pupil (or viewpoint). Ideally, the exit pupil is proximate to one of the user's eyes, and specifically, to the pupil of the user's eye. As such, the user may perceive the reflected image.

It is to be appreciated that different users may have different physiology, for example, a different interpupillary distance (IPD). More specifically, the distance between the eye pupils of one user may differ from that of another user. For example, two users with a different IPD may each wear a HWD (or similarly configured HWDs). The HWD may project an image to a lens with an HOE. The HOE may reflect the image to an exit pupil. When the HWD is worn by a first user, the exit pupil may be proximate to the first user's eye pupil. However, when the HWD is worn by a second user, the exit pupil may not be proximate to the second user's eye pupil as the second user has a different IPD than the first user (e.g., the second user's eyes are closer together than the first user's eyes, or the like). As such, the first user may correctly perceive the projected image but the second user may not.

The present disclosure provides a HWD adapted to accept lenses with different HOEs. For example, the present disclosure can provide a HWD configured to receive removable lenses. These removable lenses include an HOE. The HOE in one removable lens may be different (e.g., in a different location, with different optical characteristics, or the like) than the HOE in another removable lens to provide a HWD that can be provisioned for different IPDs.

Furthermore, the HWD comprises a projector arranged to project an image into a location corresponding to the HOE of the lens mounted in the HWD. The projector includes a light source and a microelectromechanical system (MEMS) mirror arranged to oscillate about a number of oscillation axes to receive light emitted from the light source and reflect the light towards the lens to project an image onto the lens, and specifically onto the HOE. The projector can include an image location controller to control a position on the lens to which the image is projected. For example, the controller can shift the image from left to right (or from top to bottom) across the surface of the lens to project the image onto a location corresponding to a lens and HOE mounted to the HWD.

In general, the controller can delay a start of light corresponding to pixels of the image being emitted from the light source to correspond to a particular time in the periodic oscillation of the MEMS mirror. The controller can control the number of pixels in the image or can control the time period over which the light is emitted. The controller can control the light emitted from the light source to have different times depending upon the portion of the periodic oscillation, for example, the projector can implement different timing for left to right versus right to left MEMS mirror sweep.

Accordingly, a HWD adapted to accept a number of lenses each having an HOE can be provided. Each of the HOEs in the lenses may be configured to reflect an image projected onto the HOE to an exit pupil in a particular location, where the exit pupil for one HOE may differ from the exit pupil of another HOE. For example, a first lens with a first HOE may be provided to reflect an image to a first exit pupil. A second lens with a second HOE may be provided to reflect the image to a second exit pupil. The first and second exit pupils may be displaced from each other, for example, in a horizontal direction. Accordingly, the HWD may be provisioned with either the first lens or the second lens to provide an exit pupil in either the first or second exit pupil location. As such, the HWD may be configured to provide an exit pupil (e.g., reflected image) in a first location for a first user with a first IPD (e.g., distance between pupils) or in a second location for a second user with a second IPD.

During operation, the projection system projects an image onto the location of the lens corresponding to the HOE. Thus, a HWD accounting for different IPDs (e.g., an IPD of the intended user, or the like) is provided.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, known structures and devices are shown in block diagram form in order to facilitate a description thereof. The intention is to provide a thorough description such that all modifications, equivalents, and alternatives within the scope of the claims are sufficiently described.

Additionally, reference may be made to variables, such as, "a", "b", "c", which are used to denote components where more than one component may be implemented. It is important to note, that there need not necessarily be multiple components and further, where multiple components are implemented, they need not be identical. Instead, use of variables to reference components in the figures is done for convenience and clarity of presentation.

FIG. 1 illustrates an embodiment of a system 100. System 100 may include a tunable projector 110 and an optical imaging display 120. In general, the components of system 100 operate to provide a user with a computer-mediated reality. For example, system 100 may overlay computer generated graphics onto a user's view of the world. In some examples, system 100 may provide a virtual reality view.

Optical imaging display 120 includes a projection surface 122 and holographic optical element (HOE) 124 (also referred to as a holographic optical combiner). During operation, the projection system 110 projects light 101 onto lens 122. The projected light 101 can correspond to virtual images. The lens 122, and specifically the HOE 124, reflects (or redirects) the light towards a viewpoint 103 (or exit pupil). More particularly the HOE 124 reflects the projected light 101.

The tunable projector 110 can also project light 101' within projection range 111 (e.g., to project images onto lens 122). Said differently, the tunable projector 110 can project light 101' across range 111 to project an image onto a location of the lens 122, for example, corresponding to the location of the HOE 124 on lens 122. This projected image is reflected by the HOE to be perceived within viewpoint 103'. This is explained in greater detail below (e.g., refer to FIGS. 7A-7D and FIGS. 8A-8D).

However, in general, the system 100 is adapted to receive lens 122, or another lens like lens 122 having HOEs 124 in different locations (e.g., refer to FIG. 4, FIGS. 5A-5C and FIGS. 6A-6C). The tunable projector 110 projects an image onto a location of the lens corresponding to the HOE 124 to project an image at viewpoint 103. Thus, the location of the viewpoint 103 relative to the lens or system 100 can change, for example, to accommodate different IPDs.

With some examples, the lens 122 and the HOE 124 redirect the projected images and also transmit light from the external environment to the viewpoint 103. As such, a virtual image and a real world image may be presented at the viewpoint 103. It is noted, that although the device 100 is depicted with a single projection system 110 and optical imaging display 120, the device 100 may include multiple projection systems 110 and optical imaging displays 120 (e.g., lenses 122 and HOEs 124) to provide multiple viewpoints 103 (e.g., for a multiple eye display, or the like).

As used herein, projection surface 122 is referred to as lens 122 interchangeably. However, lens 122 may not be a lens as traditionally used. For example, lens 122 can be a helmet visor, or other projection surface in which a computer-mediated reality is desired or in which the system 100 can be implemented. As such, embodiments are not limited in this context.

Figure 2:
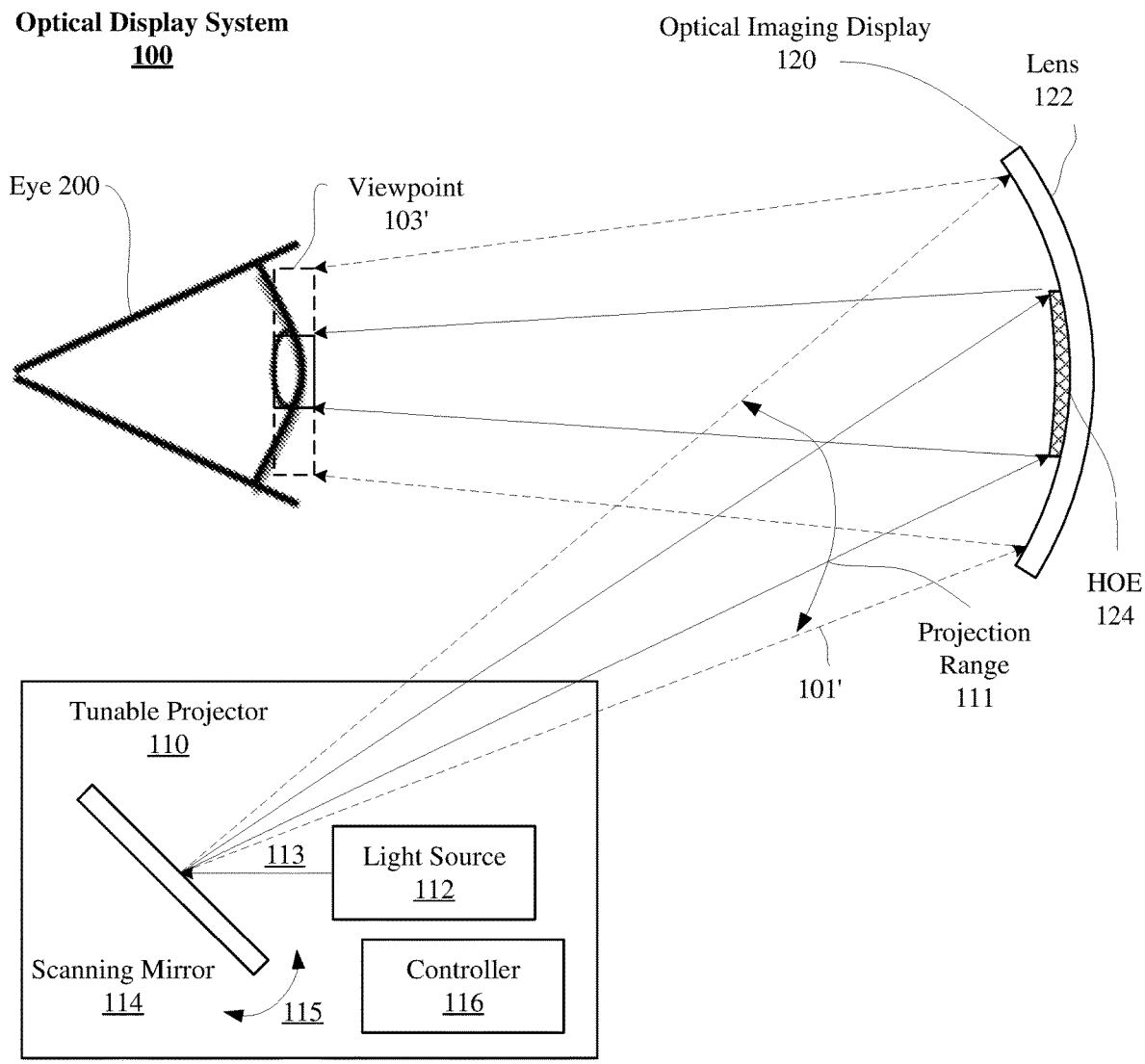
FIG. 2 illustrates the example optical display system of FIG. 1 in conjunction with a user's eye.

FIG. 2 illustrates an embodiment of system 100 in conjunction with an eye 200. In various embodiments, optical imaging display 120 may reflect an image projected by tunable projector 110 towards an eye 200 of a user. In various such embodiments, when eye 200 is located within viewpoint 103, one or more portions of the reflected image may be visible to the eye 200.

In some examples, tunable projector 110 can include a light source 112 to emit a light beam 113 of at least one wavelength. The light beam 113 is incident on (or received by) a scanning mirror 114. The scanning mirror 114 rotates about a number of axes 115 to scan the light beam 113 as projected light 101 across lens 122 and particularly across HOE 124. In general, scanning mirror 114 scans the received light beam 113 onto (or across) the lens 122 while the light source 112 modulates or modifies the intensity of the light beam 113 to correspond to a digital image. Thus, a virtual or mediated reality display can be presented as the viewpoint 103 and may be perceived by a user via eye 200.

The tunable projector 110 further includes an image location controller 116 to control light beam 113 to change a location of projected image within range 111. For example, the image location controller 116 can modify light beam 113 to change a location of projected light 101 (e.g., corresponding to an image) within range 111 to accommodate different positions of HOE 124 on the surface of lens 122.

Figure 3:
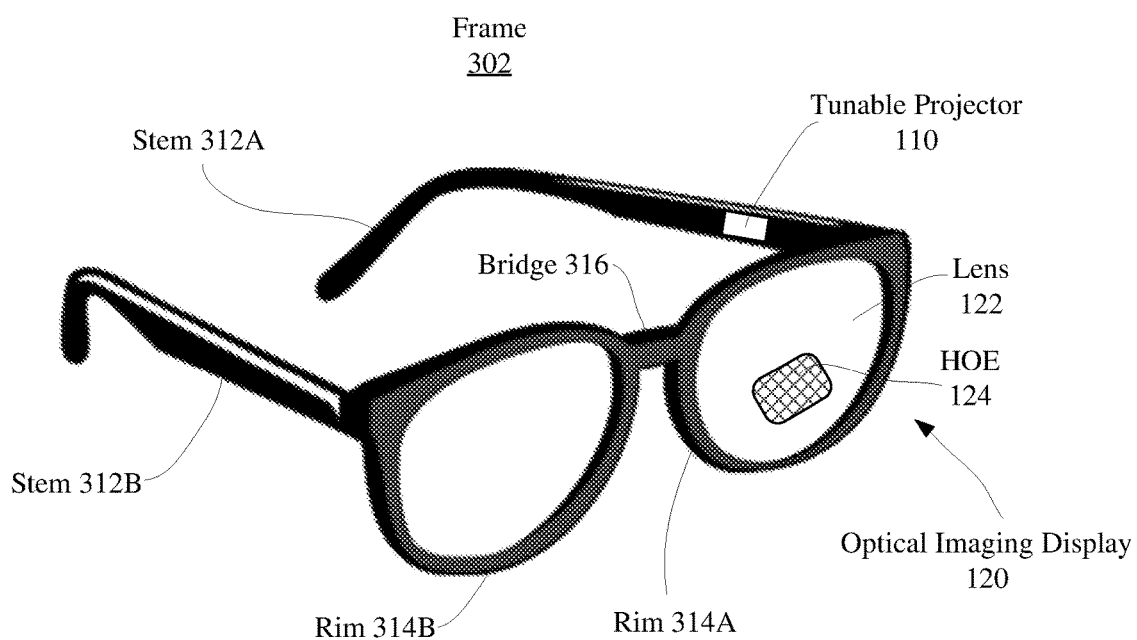
FIG. 3 illustrates a second example optical display system.

FIG. 3 illustrates an embodiment of wearable device 300. Wearable device 300 can include a wearable frame 302, which can couple with tunable projector 110 and optical imaging display 120. In various embodiments, wearable frame 302 may hold tunable projector 110 in a certain position with respect to display 120. For example, wearable frame 302 may hold tunable projector 110 at a spacing and angle with respect to display 120 such that images are appropriately reflected by HOE 124 to be viewed by the eye (e.g., eye 200) of a user. In some embodiments, wearable frame 302 may position the eye 200 (refer to FIG. 2) at a spacing with respect to display 120 such that the eye 200 of a user is appropriately located in viewpoint 103 (refer to FIGS. 1 and 2). Embodiments are not limited in this context.

Wearable frame 302 may include stems 312A, 312B, rims 314A, 314B, and bridge 316. Stem 312A may couple to tunable projector 110 and rim 314A. Rim 314A may couple to display 120. For example, display 120 may include lens 122 held by rim 314A. In some embodiments the lens 122 may be plastic. HOE 124 can be affixed to lens 122 as described herein. Rim 314A may be connected to rim 314B by bridge 316. In various embodiments, wearable frame 302 may include any device able to properly position tunable projector 110 with respect to display 120 to enable the desired reflection of a projected image by the field imaging display 120. For instance, wearable frame 302 may include one or more of eyeglass frames, a headband, a hat, a mask, a helmet, sunglasses, or similar head worn devices. Further, the number and position of tunable projector 110 and display 120 may be altered without departing from the scope of this disclosure. For example, wearable frame 302 may include two projectors and two displays to enable computer-augmented reality for both eyes of a user. As depicted, in some embodiments, tunable projector 110 may be embedded in stem 312A of a pair of glasses. In other embodiments, tunable projector 110 may be embedded in rim 314A or bridge 316 of the wearable frame 302. In some examples, the tunable projector can be coupled (e.g., attached, embedded, or the like) to stem 312B, rim 314A, rim 314B, or the like.

Furthermore, display 120 can be a removable display, mounted in frame 302. For example, different lenses 122 having an HOE 124 in a different location from each other may be provisioned with frame 302 to provide a HWD 300 adaptable to different viewpoint locations. Thus, HWD 300 can provide a mediated-reality experience for users having different IPDs.

It will be appreciated that the components of wearable frame 102 and their arrangement illustrated in FIG. 3 is exemplary and other components and arrangements may be used without departing from the scope of this disclosure. For example, wearable frame 302 may include control circuitry and a power source. In some embodiments, the power source may include a battery or similar power storage device and provide operational power to wearable frame 302. Control circuitry may include logic and/or hardware to implement one or more functional aspects of system 100. For instance, control circuitry may enable wearable frame 302 to wirelessly communicate with one or more networks.

In some examples, lens 122 is an at least partially transparent surface with the HOE 124 affixed onto an inner (e.g., user facing) surface of lens 122. In some examples, the HOE 124 can be affixed to an external (e.g., not user facing) surface of lens 122. In some examples, the HOE 124 can be embedded (e.g., entirely or partially) within lens 122, can form an integral part of lens 122, or can form the entirety of lens 122. Example are not limited in these contexts. During operation, the lens 122 and the HOE 124 may transmit light incident on a real world side of the lens 122 to provide a real world view. In some examples, the lens 122 is opaque and the lens 122 does not transmit light incident on a real world side of the lens 122. With some examples, the lens 122 may be sunglass lenses to reduce an amount or type of light transmitted through the lenses, for example, by polarization or absorption. With some examples, the lenses 122 may be prescription lenses to correct or augment light perceived from the real world and/or the virtual image.

Furthermore, as noted, although reference herein is made to lens and particularly to a pair of eye glasses having a lens 122 and HOE 124 as described. The present disclosure can be applied to other viewing apparatus, such as, for example, helmets, or the like.

Figure 4:
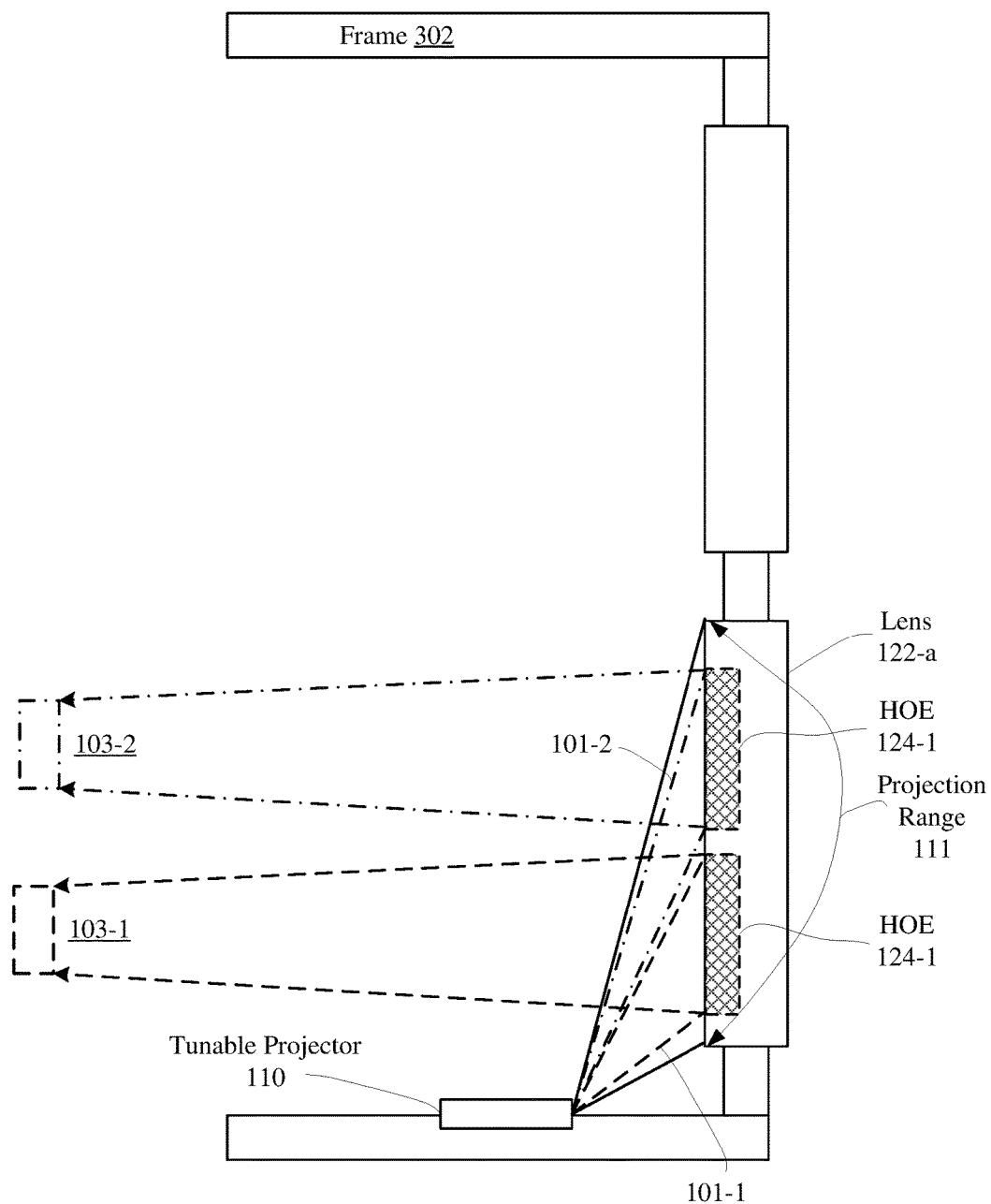
FIG. 4 illustrates the example optical display system of FIG. 3 in alternate detail.

FIG. 4 is a block diagram of a top view of frame 302 of HWD 300. As noted above, frame 302 is adapted to receive a number of lenses 122. Where each lens 122 has an HOE 124, which can be in a different location. For example, frame 302 is depicted including lens 122-*a*, where "a" is positive integer. It is noted, that lens 122-*a* depicted in this figure is shown with HOE 124-1 and HOE 124-2 in horizontal locations within the lens 122-*a*. This is done for clarity in describing the reflection of light from the HOEs 124-*a* based on their position relative to the tunable projector 110.

However, during practice, lens 122-*a* can have a single HOE 124-*a* positioned in a location within lens 122 for a specific IPD (e.g., refer to FIGS. 5A-5C and FIGS. 6A-6C).

During operation, the tunable projector 110 projects light 101 onto the lens 122-*a*. For example, the controller 116 of projector 110 can control light source 112 to cause light source to emit light at times and/or durations in relation to oscillation of MEMS mirror 114 to cause light 101 to be projected onto lens 122-*a* in an area corresponding to the location of HOE 124-*a* within lens 122-*a*. For example, controller 116 can cause projector 110 to project light 101-1 onto HOE 124-1. Likewise, controller 116 can cause projector 110 to project light 101-2 onto HOE 124-2. Thus, projector 110 can project an image onto HOEs 124-1 or 124-2 to cause the image to be viewable at viewpoint 103-1 or 103-2, respectively.

It is noted, viewpoints 103-1 and 103-2 are offset from each other in a horizontal direction. Accordingly, a lens (e.g., the lens 121-1, 121-2, or the like) may be provided and the tunable projector 110 configured to provide an exit pupil (e.g., viewpoint 103-1, viewpoint 103-2, or the like) for a particular IPD.

FIGS. 5A-5C and 6A-6C depict example implementations of the HWD 300 for two different users, respectively, each having different IPDs. It is noted, that these example implementations, the hypothetical users and their hypothetical IPDs are provided for convenience and clarity in discussing the examples of the present disclosure. Furthermore, these figures are not drawn to scale. Examples are not limited in any of these respects.

Figure 5A:
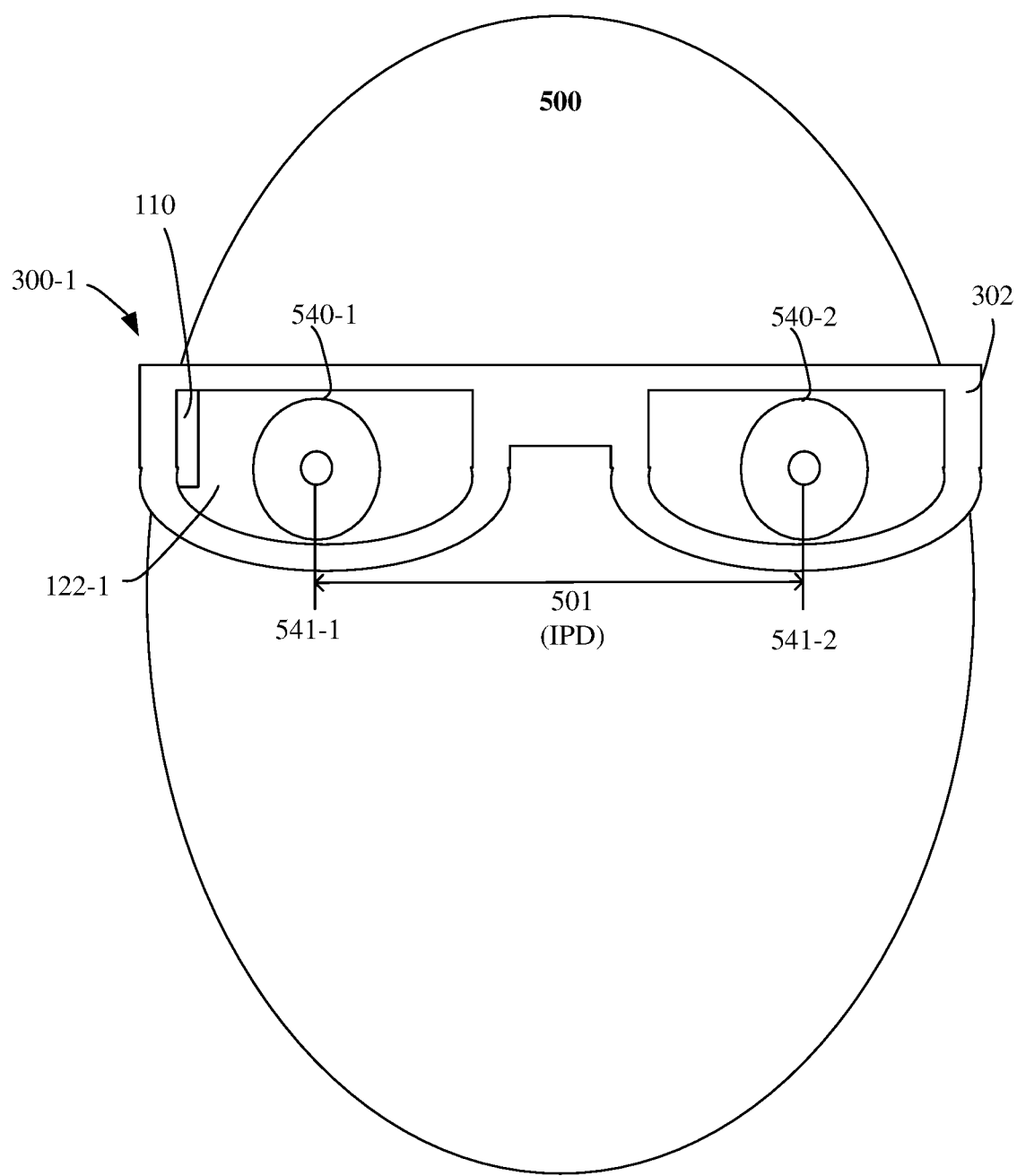
FIGS. 5A-5C illustrate the example optical system of FIG. 3 in conjunction with a first user.
Figure 5B:
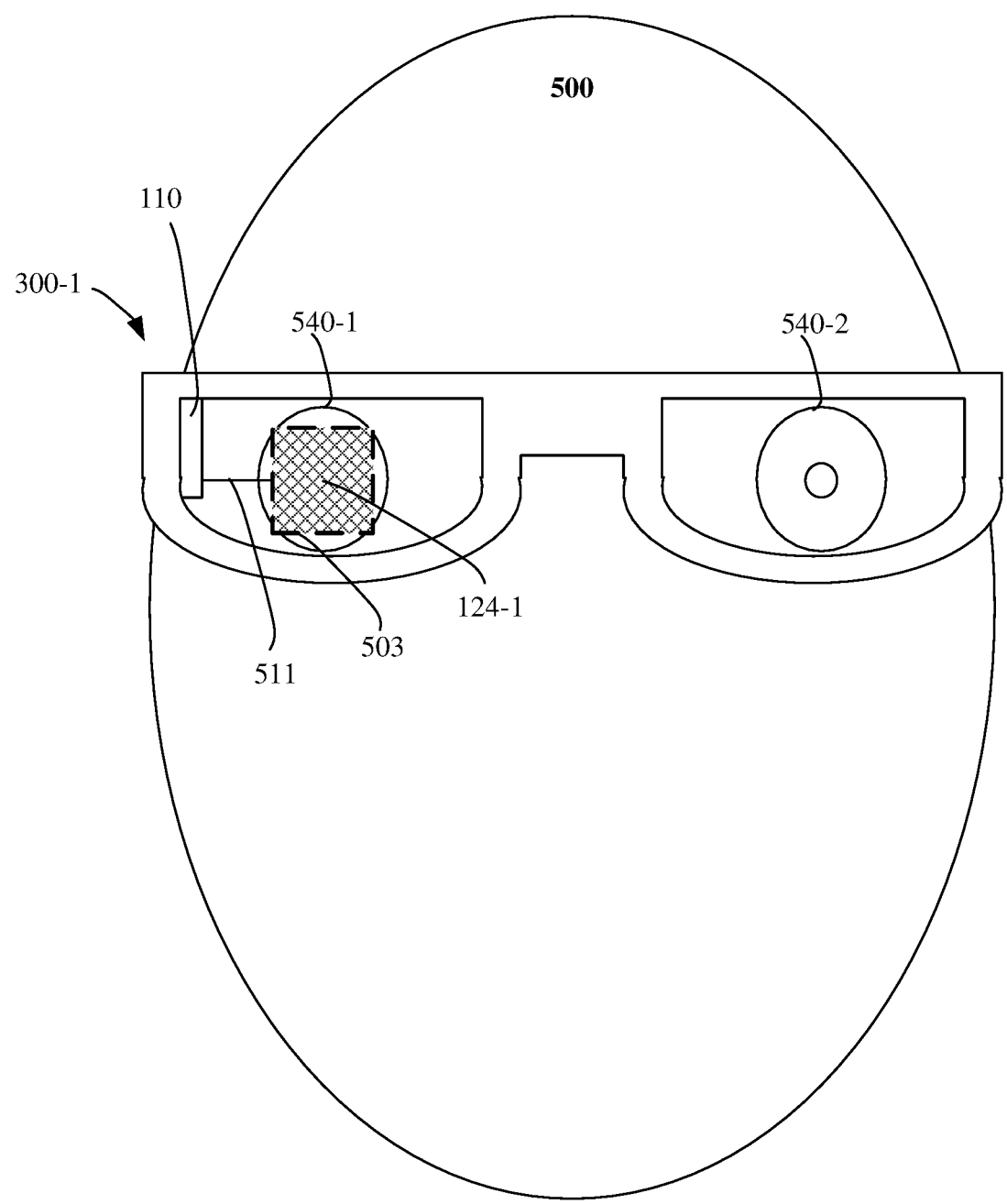
Figure 5C:
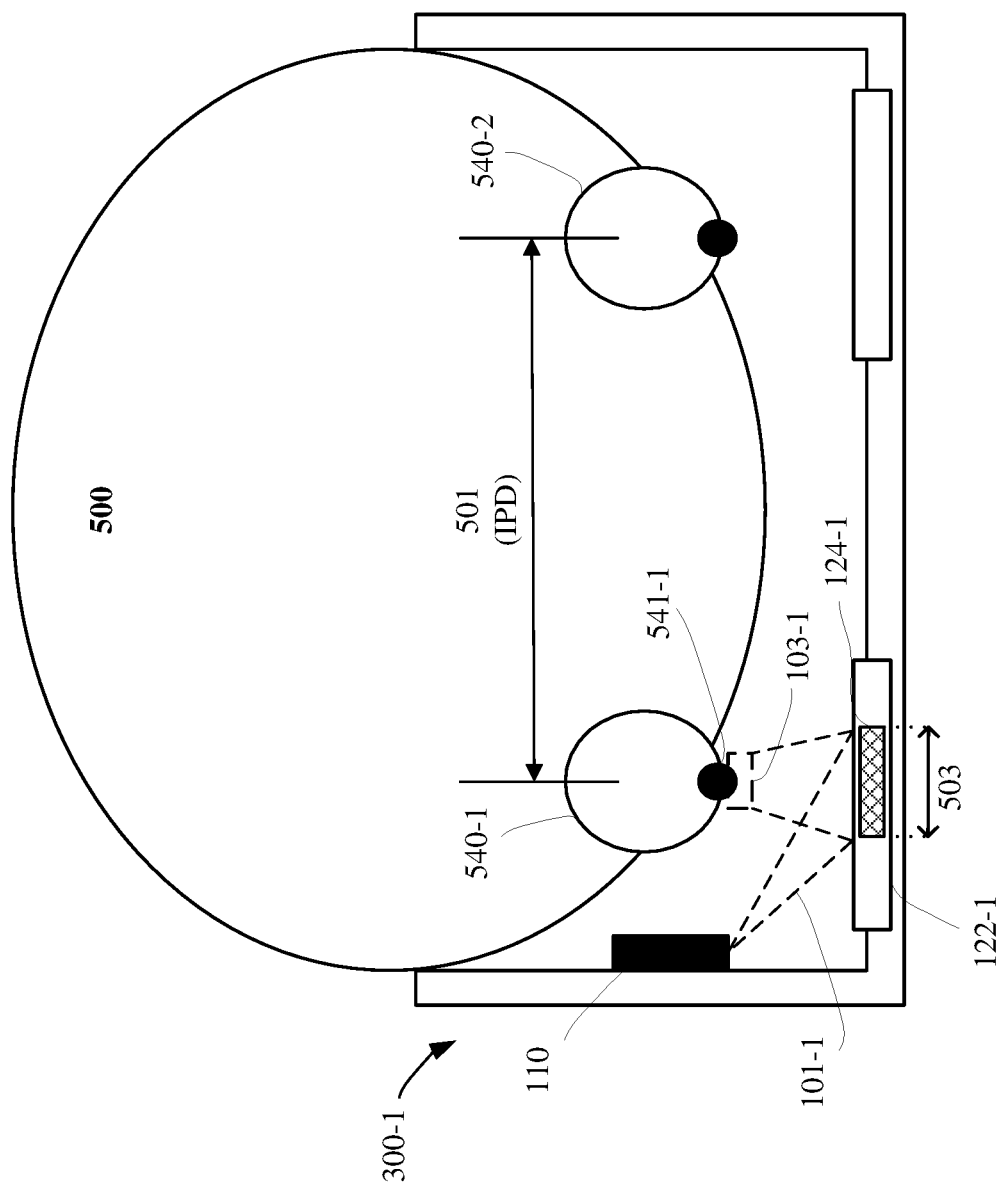

Turning more particularly to FIGS. 5A-5C, these figures depict the example implementation of HWD 300-1 provided to a user 500. In FIG. 5A, the user 500 is depicted including eyes 540-1 and 540-2, and a corresponding IPD 501. More specifically, the distance between the input pupils 541-1 and 541-2 of the user's eyes 540-1 and 540-2 is the IPD 501.

The user 500 is depicted wearing the device 300-1, which has the removable lens 122-1 operably coupled therein. In FIG. 5B, the lens 122-1 is depicted with the HOE 124-1 in a particular location. More specifically, the HOE 124-1 is depicted disposed a horizontal distance 511 away from the tunable projector 110, occupying area 503. In FIG. 5C, a top view of the user 500 wearing the device 300-1 is depicted. The tunable projector 110 is depicted projecting light 101-1 onto a portion of lens 122-1 to project an image onto area 503, and thus, HOE 124-1. The image is reflected by the HOE 124-1 to viewpoint 103-1. As depicted, viewpoint 103-1 is proximate to the input pupil 541-1 of the users eye 540-1. Accordingly, by providing the lens 122-1 with HOE 124-1 in the set location and configuring tunable projector 110 to project light 101-1 into area 503, viewpoint 103-1 is provided for user 500 having IPD 501.

Figure 6A:
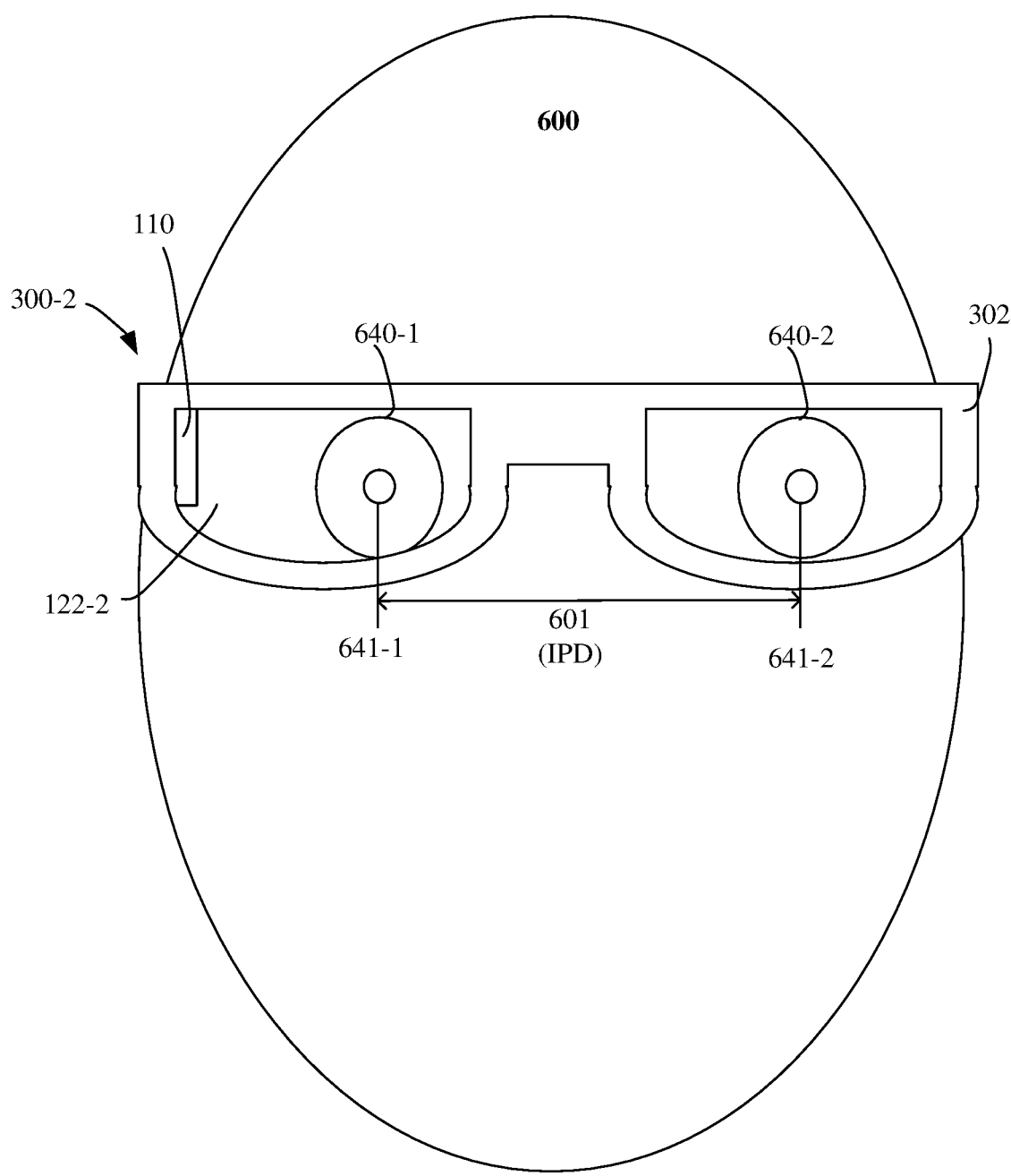
Figure 6B:
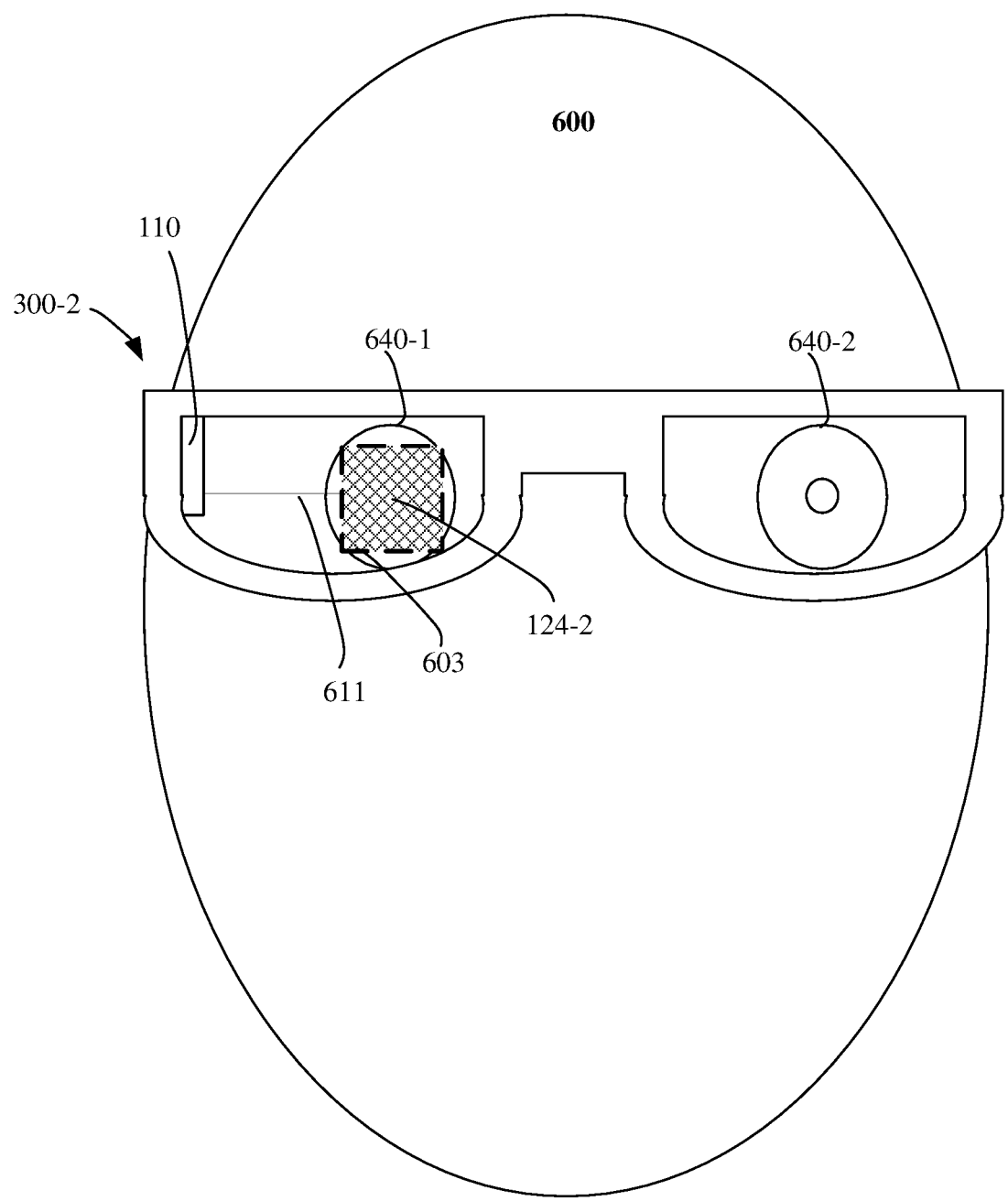

Turning more particularly to FIGS. 6A-6C, these figures depict the example implementation of HWD 300-2 provided to a user 600. In FIG. 6A, the user 600 is depicted including eyes 640-1 and 640-2, and a corresponding IPD 601. More specifically, the distance between the input pupils 641-1 and 641-2 of the user's eyes 640-1 and 640-2 is the IPD 601.

The user 600 is depicted wearing the device 300-2, which has the removable lens 122-2 operably coupled therein. In FIG. 6B, the lens 122-2 is depicted with the HOE 124-2 in a particular location. More specifically, the HOE 124-2 is depicted disposed a horizontal distance 611 away from the tunable projector 110, occupying area 603. In FIG. 6C, a top view of the user 600 wearing the device 300-2 is depicted. The tunable projector 110 is depicted projecting light 101-2 onto a portion of lens 122-2 to project an image onto area 603, and thus, HOE 124-2. The image is reflected by the HOE 124-2 to viewpoint 103-2. As depicted, viewpoint 103-2 is proximate to the input pupil 641-1 of the users eye 640-1. Accordingly, by providing the lens 122-2 with HOE 124-2 in the set location and configuring tunable projector 110 to project light 101-2 into area 603, viewpoint 103-2 is provided for user 600 having IPD 601.

Accordingly, as depicted in FIGS. 5A-5C and FIGS. 6A-6C, a HWD configured to receive a removable lens (e.g., the lens 122-1, the lens 122-2, or the like) may be provisioned to provide a HWD with an eyebox (e.g., viewpoint 103-1, viewpoint 103-2, or the like) for different IPDs. Accordingly, the device 300 may be configured for a particular user by, for example, measuring the user's IPD (e.g., in an optometrist office, using digital tools, or the like), fixing the appropriate lens 122-a into the frame 101, and configuring tunable projector 110 to project an image onto an area of the lens 122-a corresponding to the location of the HOE 124-a.

As noted, the tunable projector 110 can be configured to project images onto portions of lens 122 corresponding to a location of the HOE 124 within lens 122. For example, tunable projector 110 is depicted projecting images onto area 503 and area 603 in FIGS. 5C and 6C, respectively. In general, tunable projector 110 projects pixels from right to left and left to right as the MEMS mirror 114 oscillates back and forth along oscillation axes 115. Controller 116 can be configured to send a control signal to light source 112 to cause light source 112 to emit light 113 corresponding to pixels (e.g., lines, or the like) of an image to be projected at times corresponding to the oscillation of the MEMS mirror 114.

More specifically, as the MEMS mirror 113 oscillates about axes 115, controller 116 configured light source 112 to pulse light 113 at times coincident with a location of the MEMS mirror 114 about the axes 115. The location of the MEMS mirror 114 about axes 115 respective to pulses of light 113 can depend on the desired location of the projected image on lens 122. As such, by configuring light source 112 to emit light 113 corresponding to pixels of the image at times within the oscillation cycle of MEMS mirror 114, the location of the projected image can be shifted. It is important to note, that the location of the image can be shifted by an entire pixel or by portions of a pixel. That is, the present disclosure provides image shift granularity at less than a pixel resolution.

Figure 7B:
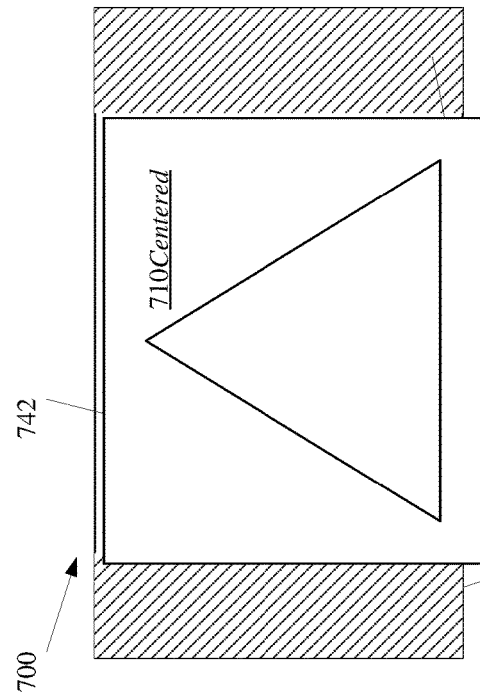
FIGS. 7A-7D illustrate examples of shifted images.
Figure 7D:
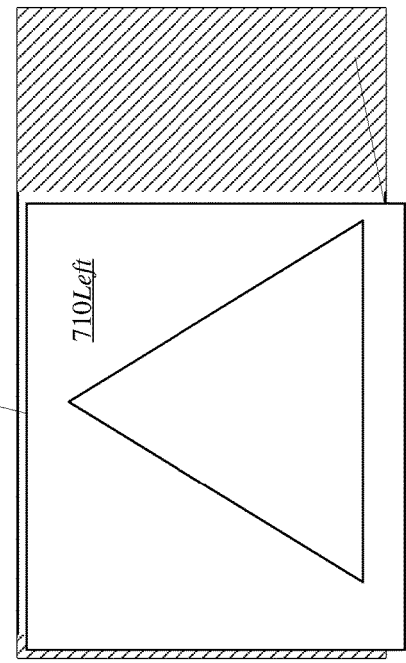
Figure 7A:
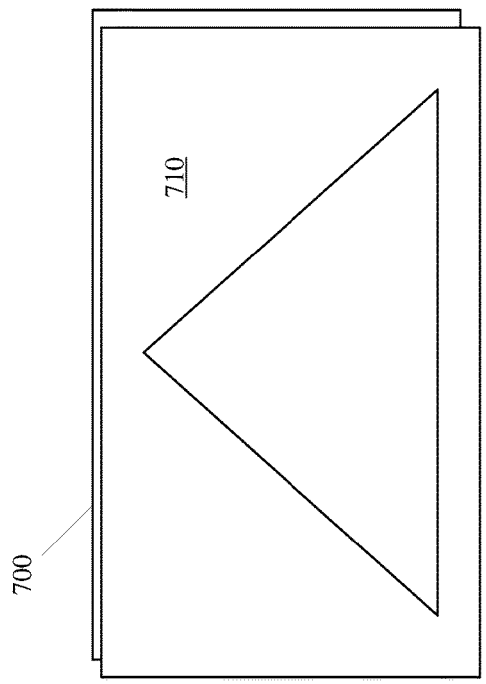
Figure 7C:
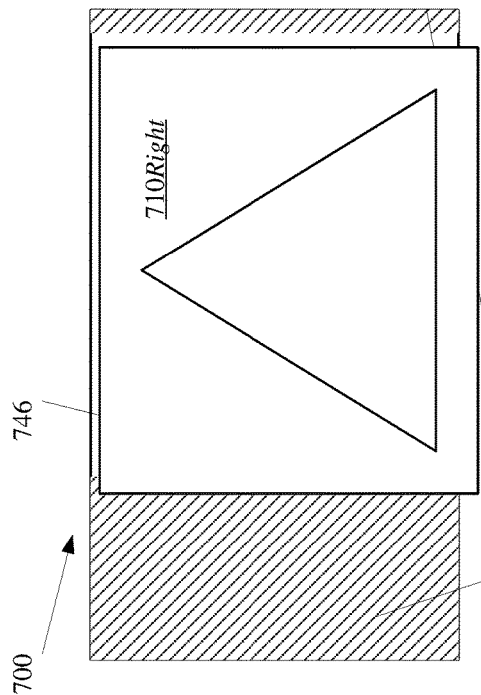

FIGS. 7A-7D depict an image projected at different location on a projection surface 700. In some examples, surface 700 can be lens 122, including an HOE in a particular location (e.g., dependent upon a desired viewpoint location, dependent upon a user's IPD, or the like). FIG. 7A depicts an image 710 projected onto surface 700. As depicted, the image 710 is projected onto the entire projection surface 700 and centered over the surface 700. Turning more specifically, to FIG. 7B, image 710Centered is depicted projected onto a portion 742 of the projection surface 700, with portions 743 not including image data. Furthermore, as depicted, image 710Centered is depicted centered across surface 700. Turning more specifically, to FIG. 7C, image 710Right is depicted projected onto a portion 744 of the projection surface 700, with portions 745 not including image data. Furthermore, as depicted, image 710Right is depicted shifted, relative to the image 700Centered, to the right in a horizontal plane across surface 700. Turning more specifically, to FIG. 7D, image 710Left is depicted projected onto a portion 746 of the projection surface 700, with portions 747 not including image data. Furthermore, as depicted, image 710Left is depicted shifted, relative to the image 700Centered, to the left in a horizontal plane across surface 700.

It is noted, that the shifted images depicted in FIGS. 7A-7D are given for example only in describing the present disclosure. Shifts can be accomplished in any direction corresponding to an axes of oscillation of MEMS mirror 114. Furthermore, the number of shifted images and the actual images projected can depend upon the implementation.

In some examples, images 700Centered, 700Right and 700Left can be projected with a border. More specifically, portions of surface 700 where the images are not projected (e.g., portions 743, 745 or 747) can have black pixels, white pixels, or another color of pixel projected to simulate a border. In other examples, the controller 116 can send a control signal to the light source 112 to cause the light source 112 to not emit light 113 during periods where pixels are not displayed (described in greater detail below). As such, the hardware required to project images (e.g., frame buffers, processing logic, etc.) can be reduced as the size of the projected images is reduced.

FIGS. 8A-8D depict example pixel timing graphs depicted in relation to oscillations of a MEMS mirror about an axes. It is noted, that the depicted graphs are given for example only. Furthermore, the graphs are described with respect to the images depicted in FIGS. 7A-7D for purposes of clarity of presentation. Additionally, the pixel line spacing and slope of oscillation is exaggerated in these figures for clarity of presentation. Furthermore, the oscillation axes is described with respect to a left to right and right to left oscillation across a horizontal plane of display surface. Examples, however, are not limited in this context.

Figure 8A:
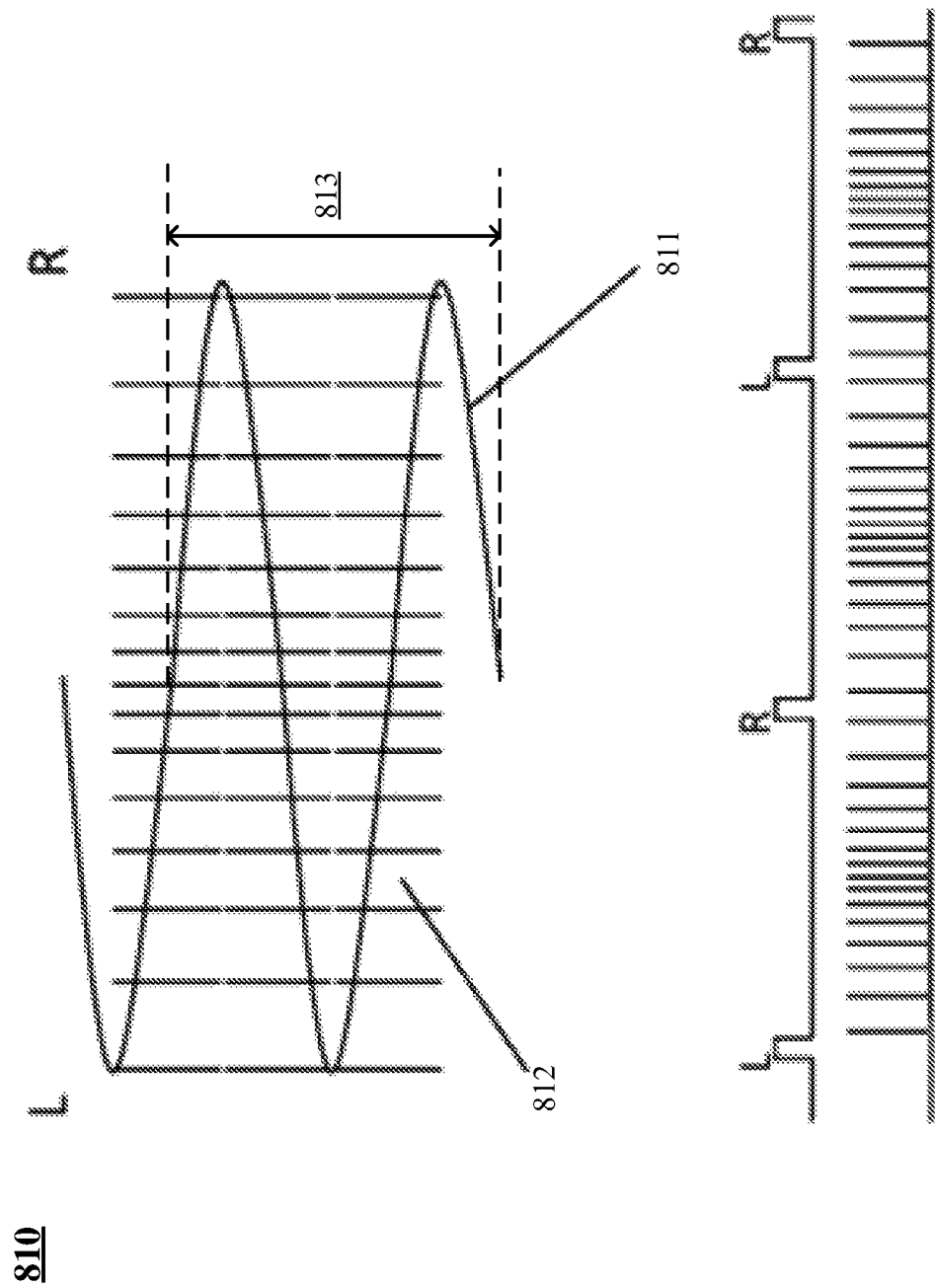
FIGS. 8A-8D illustrates examples of pixel timing versus a MEMS mirror oscillation.

Turning more specifically, to FIG. 8A, timing diagram 810 corresponding to projection of image 710 is depicted. Diagram 810 depicts oscillation 811 of MEMS mirror (e.g., MEMS mirror 114, or the like) in conjunction with pixel lines 812. The timing of emission (e.g., by light source 112, or the like) of light 113 corresponding to pixel lines 812 is depicted. As noted, MEMS mirror oscillates about axes 115 from left to right and right to left. As such, during each period 813 light 113 corresponding to pixel lines 812 are emitted by light source 112 at times coincident with the location of MEMS mirror in the scan cycle or period of oscillation. As noted, the depicted timing diagram corresponds to projection of image 710. Image 710 is centered across the entire surface 700. However, as depicted in FIG. 8A, pixel lines 812 are spaced apart more at the edges of each period than in the center. With some examples, the MEMS mirror 114 oscillates slower at edges (e.g., when changing directions of oscillation, or the like) than in the center or the oscillation axes.

Figure 8B:
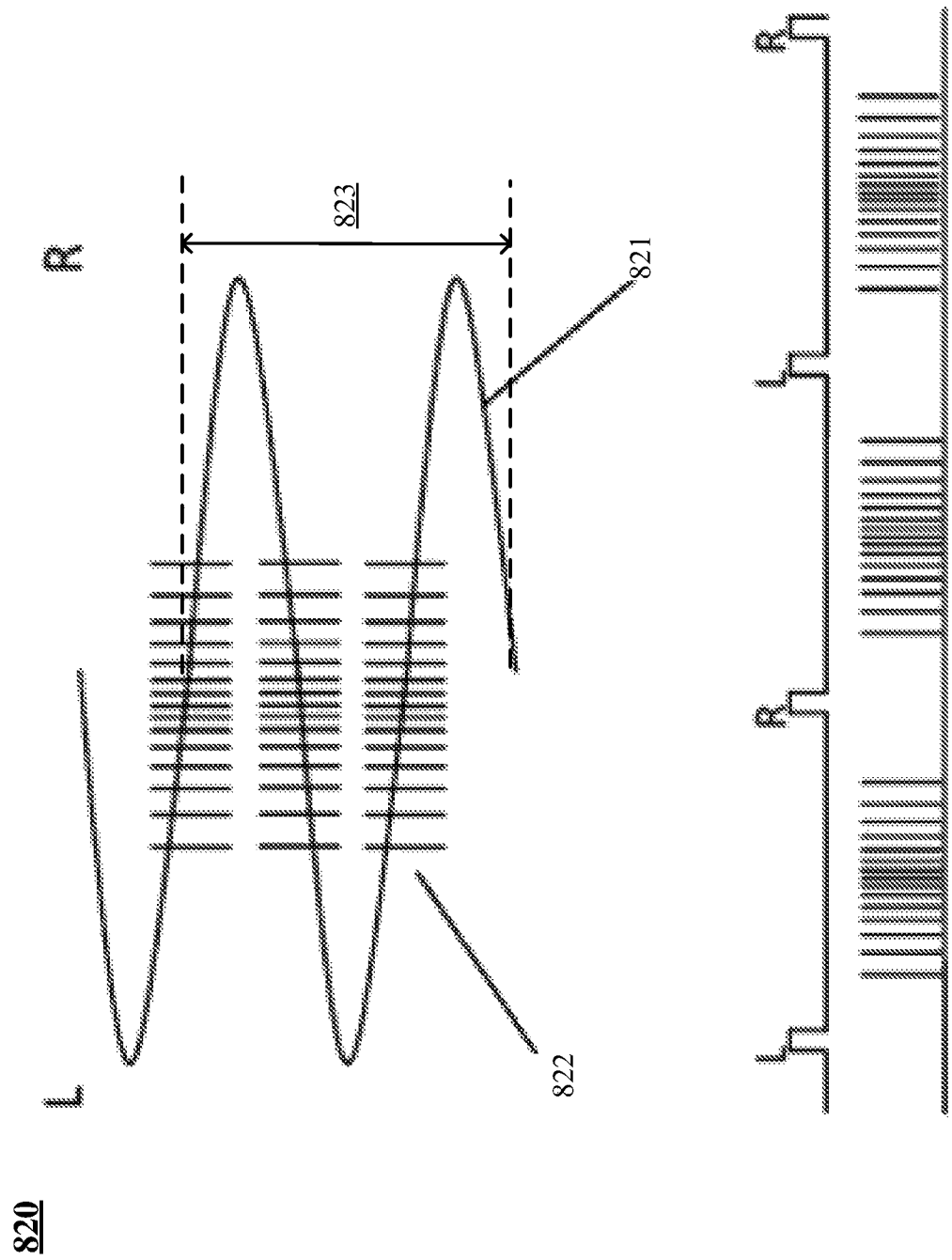

Turning more specifically, to FIG. 8B, timing diagram 820 corresponding to projection of image 710Centered is depicted. Diagram 820 depicts oscillation 821 of MEMS mirror (e.g., MEMS mirror 114, or the like) in conjunction with pixel lines 822. The timing of emission (e.g., by light source 112, or the like) of light 113 corresponding to pixel lines 822 is depicted. As noted, MEMS mirror oscillates about axes 115 from left to right and right to left. As such, during each period 823 light 113 corresponding to pixel lines 822 are emitted by light source 112 at times coincident with the location of MEMS mirror in the scan cycle or period of oscillation. As noted, the depicted timing diagram corresponds to projection of image 710Centered. Image 710Centered is centered and projected on portion 742 of surface 700. Accordingly, as depicted in FIG. 8B, pixel lines 822 are delayed from the beginning and end of each pass across the axes (e.g., left to right and right to left) as well as spaced apart more at the edges of each period than in the center.

Figure 8C:
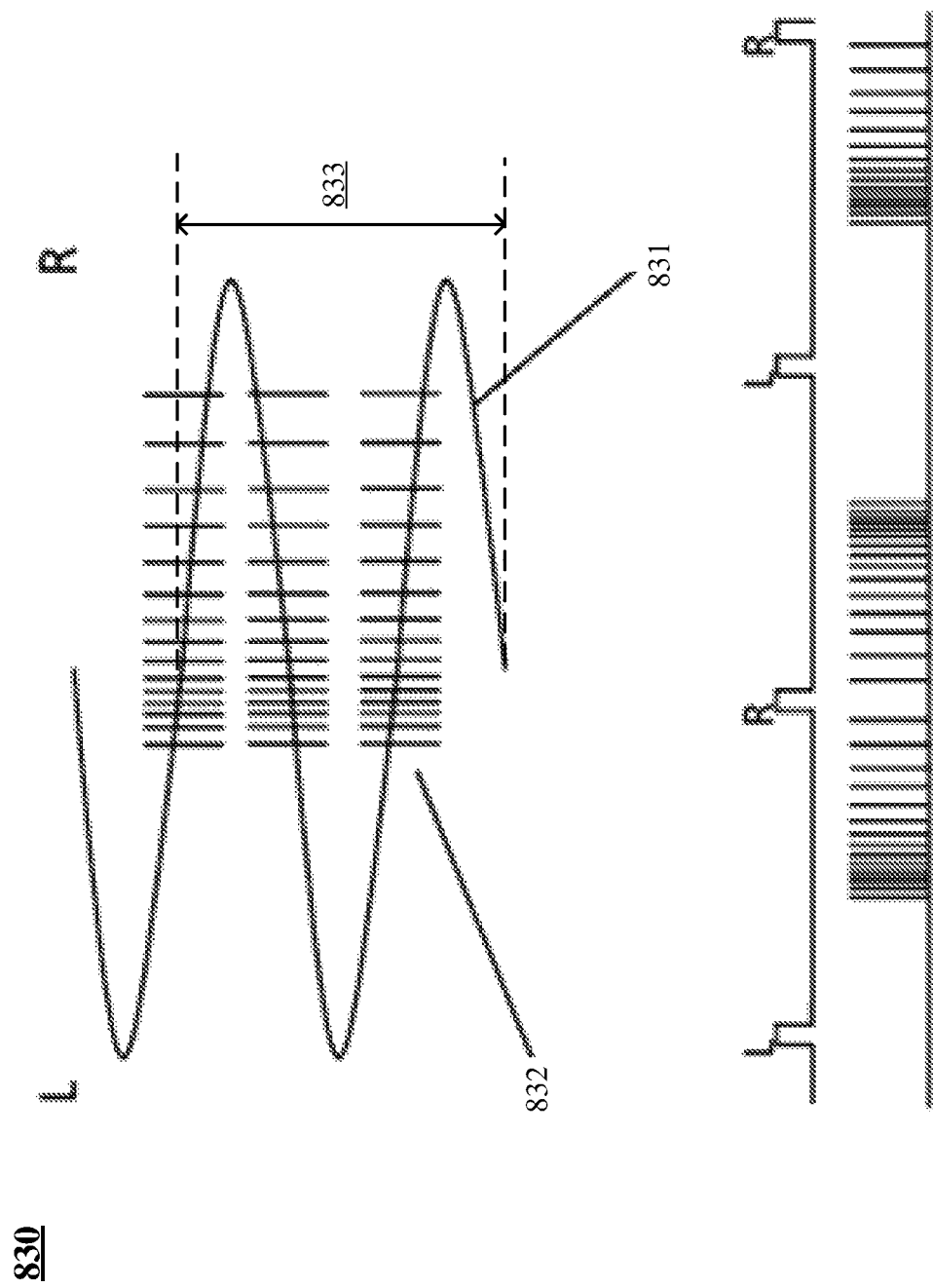

Turning more specifically, to FIG. 8C, timing diagram 830 corresponding to projection of image 710Right is depicted. Diagram 830 depicts oscillation 831 of MEMS mirror (e.g., MEMS mirror 114, or the like) in conjunction with pixel lines 832. The timing of emission (e.g., by light source 112, or the like) of light 113 corresponding to pixel lines 832 is depicted. As noted, MEMS mirror oscillates about axes 115 from left to right and right to left. As such, during each period 833 light 113 corresponding to pixel lines 832 are emitted by light source 112 at times coincident with the location of MEMS mirror in the scan cycle or period of oscillation. As noted, the depicted timing diagram corresponds to projection of image 710Right. Image 710Right is shifted to the right and projected on portion 744 of surface 700. Accordingly, as depicted in FIG. 8C, pixel lines 832 are shifted (e.g., delayed from starting in one direction and starting earlier in the other direction) relative to the centered pixel lines depicted in FIG. 8B. In some examples, the duration of light pulses 113 corresponding to pixel lines 832 can vary based on the location of the MEMS mirror within period 833. For example, pixels lines 832 can be longer at the start of one cycle respective to the other cycle. More specifically, the duration of pixel lines can be different in the left to right oscillation in addition to the timing of the start of the pixel lines and the spacing between pixel lines.

Figure 8D:
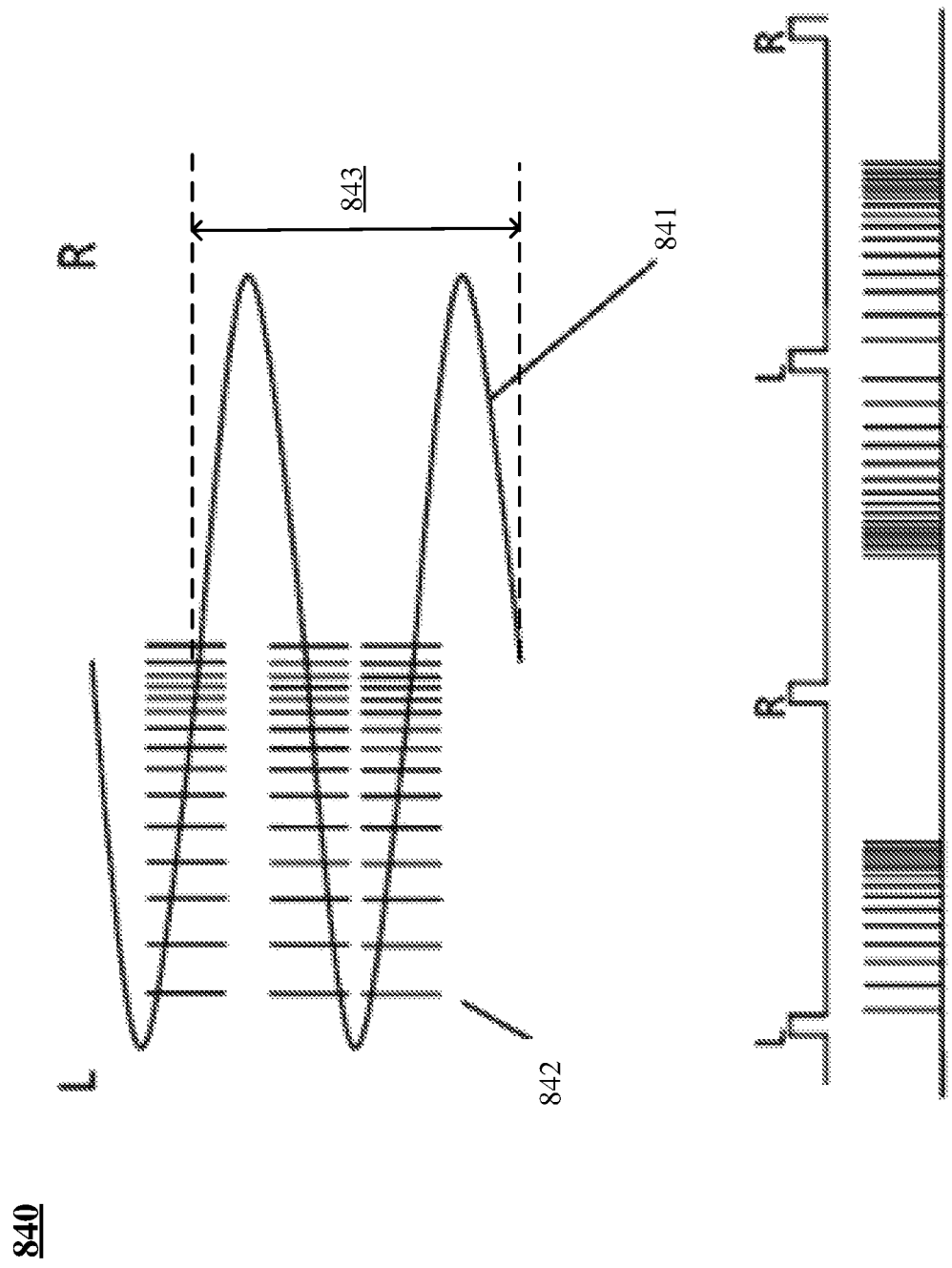

Turning more specifically, to FIG. 8D, timing diagram 840 corresponding to projection of image 710Left is depicted. Diagram 840 depicts oscillation 841 of MEMS mirror (e.g., MEMS mirror 114, or the like) in conjunction with pixel lines 842. The timing of emission (e.g., by light source 112, or the like) of light 113 corresponding to pixel lines 842 is depicted. As noted, MEMS mirror oscillates about axes 115 from left to right and right to left. As such, during each period 843 light 113 corresponding to pixel lines 842 are emitted by light source 112 at times coincident with the location of MEMS mirror in the scan cycle or period of oscillation. As noted, the depicted timing diagram corresponds to projection of image 710Left. Image 710Left is shifted to the left and projected on portion 746 of surface 700. Accordingly, as depicted in FIG. 8D, pixel lines 842 are shifted (e.g., delayed from starting in one direction and starting earlier in the other direction) relative to the centered pixel lines depicted in FIG. 8B. In some examples, the duration of light pulses 113 corresponding to pixel lines 832 can vary based on the location of the MEMS mirror within period 843. For example, pixels lines 842 can be longer at the start of one cycle respective to the other cycle. More specifically, the duration of pixel lines can be different in the left to right oscillation in addition to the timing of the start of the pixel lines and the spacing between pixel lines.

Accordingly, as depicted in FIGS. 7A-7D and FIGS. 8A-8D, projected images can be shifted across a display surface by a fraction of a pixel.

Figure 9:
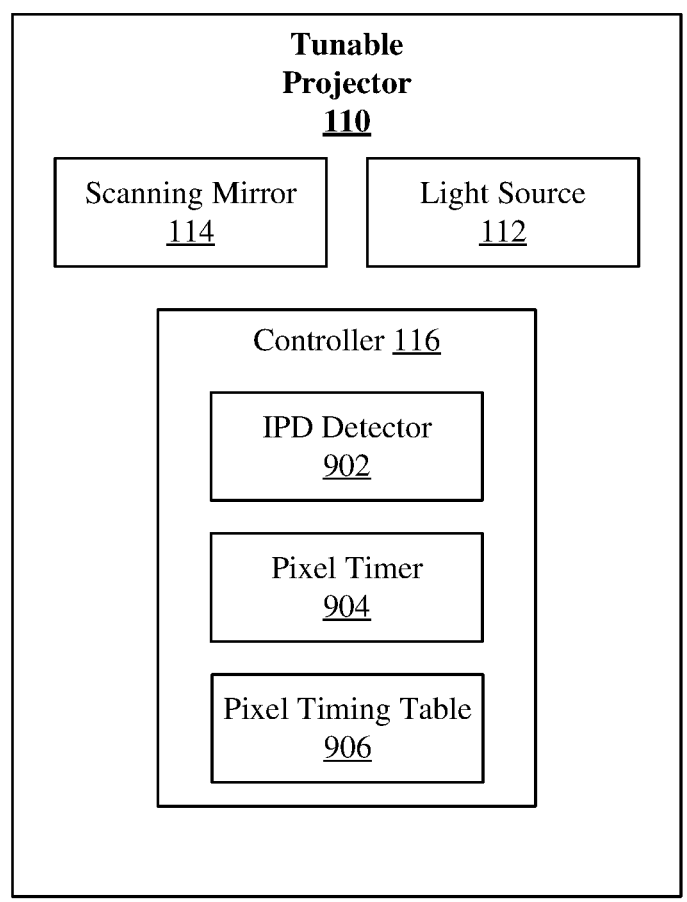
FIG. 9 illustrate an example tunable projector.

FIG. 9 depicts a block diagram of an example of tunable projector 110. In some examples, the tunable projector 110 can include the light source 112 (e.g., a laser, an LED, or the like) and movable mirror 114 configured to oscillate about an axes (e.g., axes 115, or the like). The mirror 114 may be a MEMS based mirror configured to rotate about a number of axes to scan light emitted from the light source 112 across a projection surface (e.g., the lens 122, the area of a lens corresponding to HOE 124, or the like).

Tunable projector 110 can also include a controller 116. In general, the controller 116 may comprise hardware and/or software and may be configured to send one or more control signals to light source 112 and/or the mirror 114 to cause the light source 112 to emit light and the mirror 114 to rotate about a number of axes to project the light over a particular area corresponding to the HOE of a lens removably fixed in a frame of a device to which the tunable projector 110 is disposed.

The controller 116 can include an IPD detector 902. With some examples, the IPD detector 902 may receive an information element to include an indication of an IPD (e.g., the IPD 501, 601, or the like) or an indication of a location of an HOE (e.g., the horizontal displacement from the projector (e.g., the displacement 511, the displacement 611, or the like). For example, the IPD detector 902 may receive an information element from a smart phone (or the like) to include an indication of the location of the HOE 124 in the lens 122 removably coupled to the frame 302.

Controller 116 can also include a pixel timer 904. In general, pixel timer 904 can send control signals to light source 112 to modify the duration and/or start times of light 113 corresponding to pixels in an image to be projected. In some examples, pixel timer 904 can determine a desired image location based on an IPD. Pixel timer 904 can determine pixel durations and pixel start times based on the image location and the movable mirror 114 scanning speed. With some examples, controller 116 can include pixel timing table 906. Pixel timer 904 can determine duration and/or start times for pixel based on the pixel timing table 906. With some examples, pixel timing able 906 is pre-programmed within controller 116. In some example, pixel timing able 906 is generated during operation, such as, for example, by a processing unit coupled to controller 116, processing logic included in controller 116, or the like.

FIG. 10 depicts a logic flow 1000 for projecting a virtual image. The logic flow 1000 may begin at block 1010. At block 1010 "oscillate a microelectromechanical system (MEMS) mirror about an oscillation axes" scanning mirror 114 can oscillate about an oscillation axes (e.g., axes 115, or the like).

Continuing to block 1020 "direct light from a light source at the MEMS mirror, the light corresponding to a plurality of pixels of an image" light from light source 113 can be directed to scanning mirror 114. For example, light 113 can be directed at mirror 114 to be incident on mirror 114 during oscillation of mirror 114 about axes 115.

Continuing to block 1030 "send a control signal to the light source, the control signal to include an indication of a first start time of a first one of the plurality of pixels in relation to a period of oscillation of the MEMS mirror" controller 116 can send a control signal to light source 112 to cause light source 112 to output light 113 corresponding to pixels of an image (e.g., image 700, or the like) at times corresponding to the period of oscillation of the mirror 114.

Figure 11:
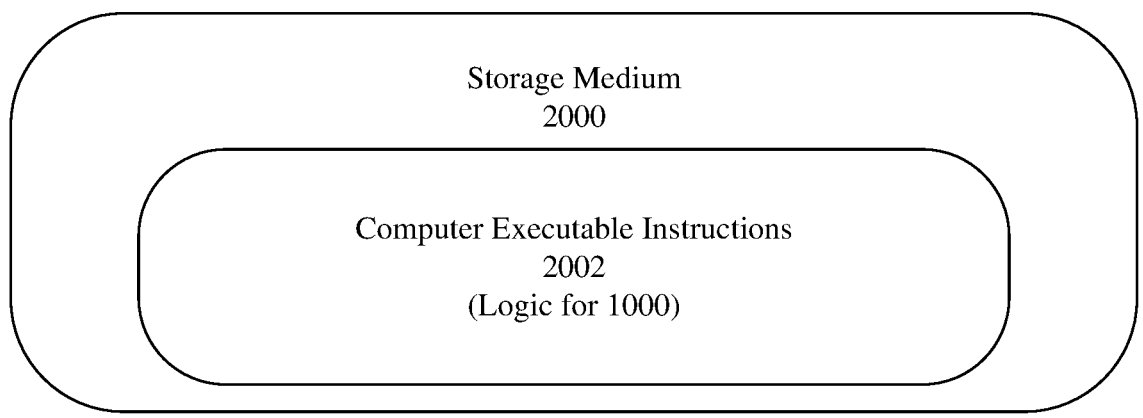
FIG. 11 illustrates an example computer readable medium.

FIG. 11 illustrates an embodiment of a storage medium 2000. The storage medium 2000 may comprise an article of manufacture. In some examples, the storage medium 2000 may include any non-transitory computer readable medium or machine readable medium, such as an optical, magnetic or semiconductor storage. The storage medium 2000 may store various types of computer executable instructions e.g., 2002). For example, the storage medium 2000 may store various types of computer executable instructions to implement technique 1000.

Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 12:
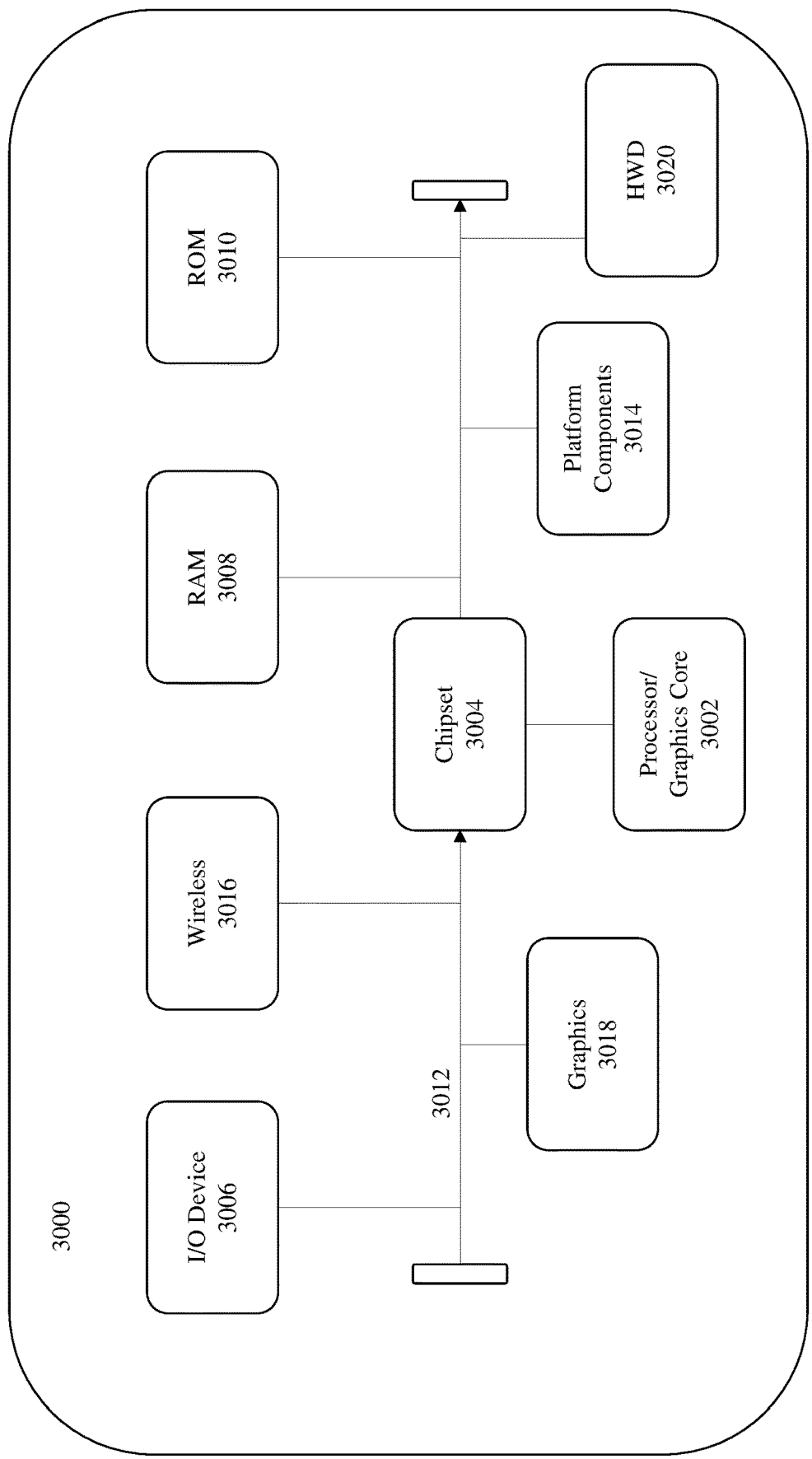
FIG. 12 illustrates another example system.

FIG. 12 is a diagram of an exemplary system embodiment and in particular, depicts a platform 3000, which may include various elements. For instance, this figure depicts that platform (system) 3000 may include a processor/graphics core 3002, a chipset 3004, an input/output (I/O) device 3006, a random access memory (RAM) (such as dynamic RAM (DRAM)) 3008, and a read only memory (ROM) 3010, HWD 3020 (e.g., HWD 300, or the like) and various other platform components 3014 (e.g., a fan, a cross flow blower, a heat sink, DTM system, cooling system, housing, vents, and so forth). System 3000 may also include wireless communications chip 3016 and graphics device 3018. The embodiments, however, are not limited to these elements.

As depicted, I/O device 3006, RAM 3008, and ROM 3010 are coupled to processor 3002 by way of chipset 3004. Chipset 3004 may be coupled to processor 3002 by a bus 3012. Accordingly, bus 3012 may include multiple lines.

Processor 3002 may be a central processing unit comprising one or more processor cores and may include any number of processors having any number of processor cores. The processor 3002 may include any type of processing unit, such as, for example, CPU, multi-processing unit, a reduced instruction set computer (RISC), a processor that has a pipeline, a complex instruction set computer (CISC), digital signal processor (DSP), and so forth. In some embodiments, processor 3002 may be multiple separate processors located on separate integrated circuit chips. In some embodiments processor 3002 may be a processor having integrated graphics, while in other embodiments processor 3002 may be a graphics core or cores.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other. Furthermore, aspects or elements from different embodiments may be combined.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the Plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. The detailed disclosure now turns to providing examples that pertain to further embodiments. The examples provided below are not intended to be limiting.

What is claimed is:

1. A tunable projector operable to project images onto a lens carrying a holographic optical element, the holographic optical element having a surface area smaller than a surface area of the lens, the tunable projector comprising:
   a light source to emit light corresponding to a plurality of pixels of an image;
   a scanning mirror positioned to receive the light emitted by the light source, the scanning mirror arranged to oscillate about at least one oscillation axis to scan the light over at least a portion of the lens; and
   a controller communicatively coupled to the light source, the controller comprising a detector to receive an information element including a characteristic related to a location of the holographic optical element and a timer to send a control signal to the light source based on the characteristic related to a location of the holographic optical element, the control signal to shift the image to a location on the lens corresponding to the location of the holographic optical element, the control signal comprising an indication of a first start time of a first one of the plurality of pixels in relation to a period of oscillation of the scanning mirror.

2. The tunable projector of claim 1, wherein the characteristic related to the location of the holographic optical element is the location of the holographic optical element on the lens.

3. The tunable projector of claim 1, wherein the characteristic related to the location of the holographic optical element is an interpupillary distance.

4. The tunable projector of claim 1, wherein the scanning mirror is arranged to oscillate from a first point on the at least one oscillation axis to a second point on the at least one oscillation axis and from the second point on the at least one oscillation axis to the first point on the at least one oscillation axis, and wherein the first start time comprises a delay from the first point.

5. The tunable projection of claim 4, wherein the control signal further comprises an indication of a second start time of a second one of the plurality of pixels in relation to the period of oscillation of the scanning mirror, and wherein the second start time comprises a delay from the second point.

6. The tunable projector of claim 1, wherein the control signal further comprises an indication of a spacing between the plurality of pixels.

7. The tunable projector of claim 6, wherein the indication of the spacing between the plurality of pixels comprises a first direction spacing and a second direction spacing, the first direction spacing corresponding to a first direction of oscillation of the scanning mirror and the second direction spacing corresponding to a second direction of oscillation of the scanning mirror.

8. The tunable projector of claim 1, further comprising a frame that carries the light source, the scanning mirror, and the controller.

9. The tunable projector of claim 8, wherein the frame includes a rim to hold the lens.

10. The tunable projector of claim 8, wherein the scanning mirror includes a microelectromechanical system (MEMS) mirror.

11. A method of projecting images onto a lens carrying a holographic optical element, the holographic optical element having a surface area smaller than a surface area of the lens, the method comprising:
 directing light from a light source to a scanning mirror, the light corresponding to a plurality of pixels of an image;
 oscillating the scanning mirror about at least one oscillation axis to scan the light over at least a portion of the lens;
 receiving an information element including a characteristic related to a location of the holographic optical element;
 generating a control signal based on the characteristic related to a location of the holographic optical element; and
 sending the control signal to the light source to shift the image to a location on the lens corresponding to the location of the holographic optical element.

12. The method of claim 11, wherein receiving an information element including a characteristic related to a location of the holographic optical element comprises receiving a location of the holographic optical element on the lens.

13. The method of claim 11, wherein receiving an information element including a characteristic related to a location of the holographic optical element comprises receiving an interpupillary distance.

14. The method of claim 11, wherein generating a control signal based on the characteristic related to a location of the holographic optical element comprises (a.1) determining a first start time of a first one of the plurality of pixels in relation to a period of oscillation of the scanning mirror based on the characteristic related to a location of the holographic optical element and (a.2) including an indication of the first start time in the control signal.

15. The method of claim 14, wherein oscillating the scanning mirror about at least one oscillation axis comprises oscillating the scanning mirror from a first point on the oscillation axis to a second point on the oscillation axis and from the second point on the oscillation axis to the first point in the oscillation axis, wherein the first start time comprises a delay from the first point.

16. The method of claim 14, wherein generating a control signal based on the characteristic related to a location of the holographic optical element further comprises (b.1) determining a second start time of a second one of the plurality of pixels in relation to the period of oscillation of the scanning mirror based on the characteristic related to a location of the holographic optical element and (b.2) including an indication of the second start time in the control signal.

17. The method of claim 16, wherein oscillating the scanning mirror about at least one oscillation axis comprises oscillating the scanning mirror from a first point on the oscillation axis to a second point on the oscillation axis and from the second point on the oscillation axis to the first point in the oscillation axis, wherein the first start time comprises a first delay from the first point and the second start time comprises a second delay from the second point.

18. The method of claim 14, wherein generating a control signal based on the characteristic related to a location of the holographic optical element further comprises including an indication of a spacing between the plurality of pixels in the control signal.

19. A system for projecting images, the system comprising:
 a frame;
 a projection surface including a holographic optical element, the projection surface removably mounted in the frame, the holographic optical element having a surface area that is smaller than a surface area of the projection surface; and
 a tunable projector coupled to the frame, the tunable projector comprising:
  a light source to emit light corresponding to a plurality of pixels of an image;
  a scanning mirror positioned to receive the light emitted by the light source, the scanning mirror arranged to oscillate about at least one oscillation axis to scan the light over at least a portion of the projection surface; and
  a controller communicatively coupled to the light source, the controller comprising a detector to receive an information element including a characteristic related to a location of the holographic optical element and a timer to send a control signal to the light source based on the characteristic related to a location of the holographic optical element, the control signal to shift the image to a location on the projection surface corresponding to the location of the holographic optical element, the control signal comprising an indication of a first start time of a first one of the plurality of pixels in relation to a period of oscillation of the scanning mirror.

20. The system of claim 19, wherein the scanning mirror includes a microelectromechanical system (MEMS) mirror, and wherein the MEMS mirror is arranged to oscillate from a first point on the at least one oscillation axis to a second point on the at least one oscillation axis and from the second point on the at least one oscillation axis to the first point on the at least one oscillation axes, and wherein the first start time comprises a delay from the first point.

* * * * *